(12) United States Patent
Lin et al.

(10) Patent No.: US 8,271,815 B2
(45) Date of Patent: Sep. 18, 2012

(54) DEVICE FOR CONTROLLING POWER TO A PLURALITY OF PERIPHERALS BASED ON THE STATE OF A HOST COMPUTER

(75) Inventors: Wen-Tsung Lin, Taipei (TW); Yu-Hsun Lin, Taipei (TW)

(73) Assignee: J.R.J. Electronic Co., Ltd., Taipei (TW)

( * ) Notice: Subject to any disclaimer, the term of this patent is extended or adjusted under 35 U.S.C. 154(b) by 423 days.

(21) Appl. No.: 12/692,652

(22) Filed: Jan. 25, 2010

(65) Prior Publication Data

US 2011/0185194 A1    Jul. 28, 2011

(51) Int. Cl.
*G06F 1/26* (2006.01)
*G06F 1/32* (2006.01)
(52) U.S. Cl. ......... 713/320; 713/300; 713/310; 713/340
(58) Field of Classification Search .................. 713/300, 713/310, 320, 340; 307/11, 38, 39
See application file for complete search history.

(56) References Cited

U.S. PATENT DOCUMENTS

| | | | |
|---|---|---|---|
| 6,586,849 B2 * | 7/2003 | Tarr | 307/38 |
| 6,735,705 B1 * | 5/2004 | Egbert et al. | 713/300 |
| 8,093,750 B2 * | 1/2012 | Ko | 307/38 |
| 8,166,317 B2 * | 4/2012 | Ito et al. | 713/300 |
| 2004/0221181 A1 * | 11/2004 | Yu | 713/300 |
| 2005/0030680 A1 * | 2/2005 | Lee et al. | 361/18 |
| 2005/0262367 A1 * | 11/2005 | Shih | 713/323 |
| 2009/0289501 A1 * | 11/2009 | Garb | 307/39 |
| 2011/0163600 A1 * | 7/2011 | Garb et al. | 307/35 |

* cited by examiner

*Primary Examiner* — Jaweed A Abbaszadeh (57) ABSTRACT

This invention relates to a standby power control device, which is able to apply in controlling the ON/OFF state of the power of a computer and a plurality of peripheral devices, which comprises: a power input unit, a power transformation unit, a switching unit, a start control unit, a power control unit, a power output unit, and a micro-process unit, wherein the micro-process unit is connected to the computer to detect a boot signal and a shut down signal. When the computer is shut down, the micro-process unit receives the shut down signal and to turn off the start control unit to facilitate the power control unit to disable the connection of the power input unit and the power output unit, so that the standby power of the computer and the peripheral devices is turned off for achieving the purpose of saving the electrical power.

5 Claims, 8 Drawing Sheets

DEVICE FOR CONTROLLING POWER TO A PLURALITY OF PERIPHERALS BASED ON THE STATE OF A HOST COMPUTER

BACKGROUND OF THE INVENTION

1. Technical Field

The present invention relates to a power control device, and more particularly, to a standby power control unit which uses a micro-process unit or a transformation unit to detect the boot/shut down state of a computer, and uses a power control unit to cut off the standby power of the computer and the peripheral devices thereof for saving electrical power after the computer is shut down.

2. Description of Related Art

Basically, a conventional computer consists of: a motherboard, a hard disk, a processor, a graphic card, and a memory. In order to promote the conveniences for user to access data, the conventional computers equip with a soft disk, a card reader, and a CD-ROM. Besides, for increasing the conveniences of the living and the work of people, there are many peripheral devices of the conventional computer released by computer suppliers, such as: printer, displayer, modem, speaker, TV-box, scanner, etc.

The conventional computers are booted and shut down by users, similarly, the peripheral devices as above-mentioned are turned on/off by the users as well. However, after the computer being shut down, the users often forget to turn off the power switches of the peripheral devices so as to waste power, moreover, energy will loose a lot while in a hot season.

Figure 1:
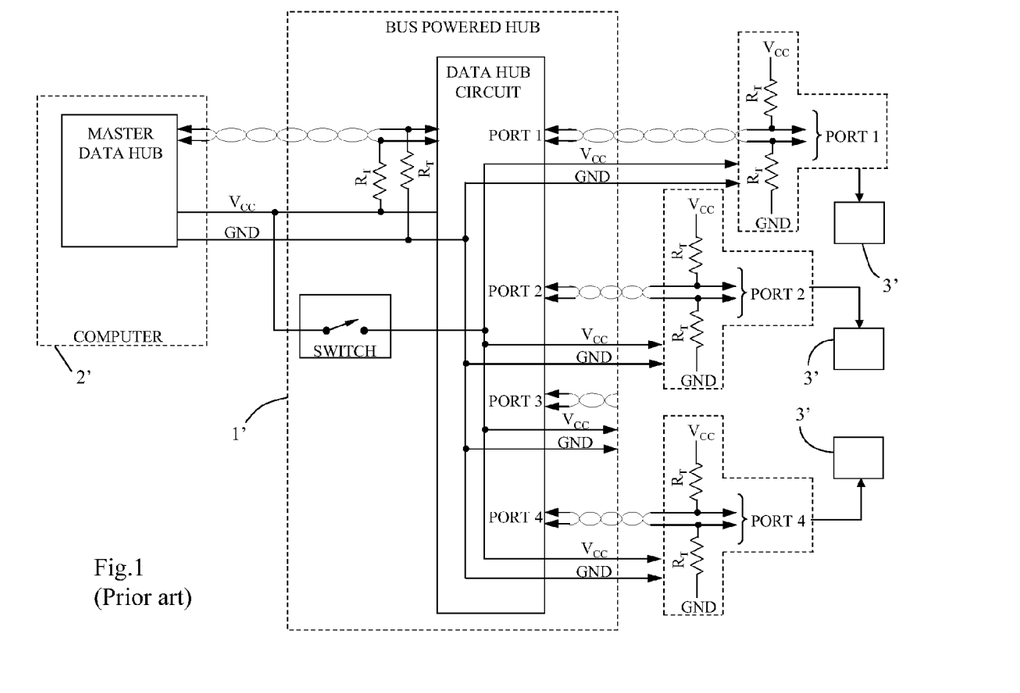
FIG. 1 is a framework of a system for power control in a universal serial bus (USB)
Figure 2:
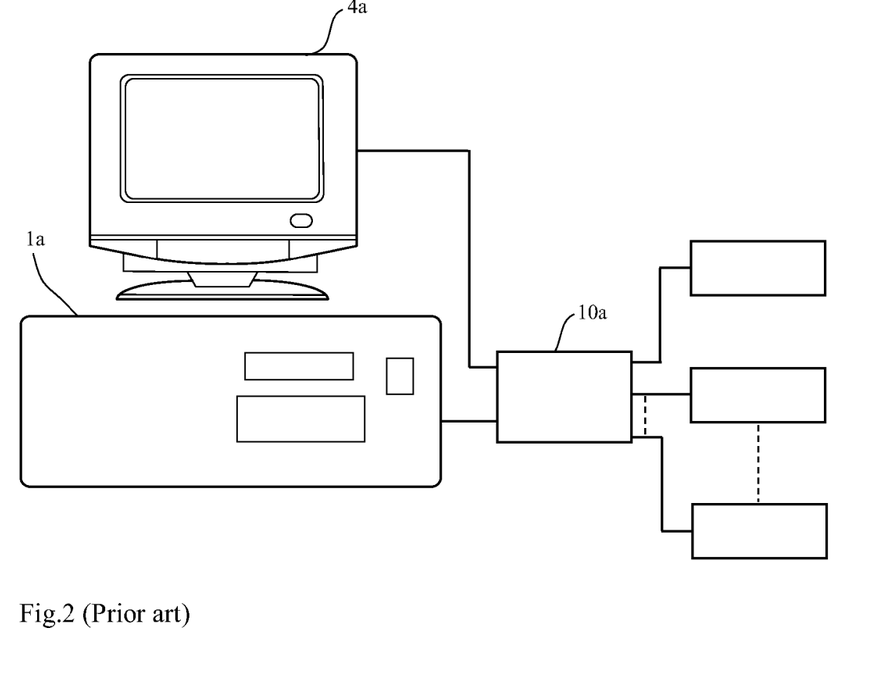
FIG. 2 is a framework of a power control device of controlling power of peripheral devices of a computer system using a universal serial bus hub.

For improving the situations of wasting the power, there are various power control devices and methods provided. Referring to FIG. 1, which illustrates a framework of a system for power control in a Universal Serial Bus (USB). As shown in FIG. 1, a Bus powered hub 1' is used to be a power supplier of a plurality of peripheral devices 3', so that a computer 2' can easily control the ON/OFF state of the peripheral devices 3' for achieving the purpose of saving power. Besides, referring to FIG. 2, which shows a framework of a power control device of controlling power of peripheral devices of a computer system using a universal serial bus hub. As shown in FIG. 2, a computer 1a outputs a state signal of a monitor 4a to a USB hub 10a, wherein the monitor 4a is connected to the computer 1a. The USB hub 10a includes a micro-process unit, which can control the power switch of the monitor 4a according to the state signal outputted by the computer 1a, so that the power dissipation of the monitor 4a is reduced to the lowest level, the power is saved.

As aforesaid, the system for the power control in the universal serial bus (USB) and the power control device of controlling the power of the peripheral devices of the computer system using the universal serial bus hub, which have simple design and best functions but still have defects and shortcomings listed as following:

1. In the system for the power control of the universal serial bus (USB), the Bus powered hub is a main power controller for the plurality of peripheral devices, however, the Bus powered hub obtains the power from the computer, so that the Bus powered hub can't control the ON/OFF state of the power of the computer;
2. In the power control device of controlling power of peripheral devices of the computer system using the universal serial bus hub, the USB hub can only control the power of the monitor for reducing the power dissipation of the monitor to the lowest level, but the USB hub can't save the power of other computer peripheral devices.

Accordingly, in view of the shortcomings of the conventional power control systems and devices, the inventor of the present invention has made great efforts to make improvement thereof and finally provides a standby power control device.

SUMMARY OF THE INVENTION

The primary objective of the present invention is to provide a standby power control device, which uses a micro process unit or a transformation unit to connect a computer for detecting a shut down signal while in the moment of turning off the computer, and cut off the standby power of the computer and the peripheral devices thereof by a power control unit so as to achieve the effect of saving power.

To accomplish the primary objective described above, a standby power control device is provided, which is capable of connecting a signal output terminal or a voltage output terminal of a computer for controlling the ON/OFF state of the power of the computer and a plurality of peripheral devices thereof, the standby power control device comprises: a power input unit, a power transformation unit, a switching unit, a start control unit, a power control unit, a power output unit, and a micro-process unit.

The power input unit is connected to an external AC power source, and the power transformation unit is able to transform the AC power of the external AC power source to a DC power, wherein the DC power is introduced into the power control unit by the switching unit and the start control unit. The power control unit is able to control the output of the AC power of the external AC power source for facilitating the computer and the peripheral devices to obtain the AC power by connecting the power output unit. The micro-process unit is able to receive a boot signal and a shut down signal outputted from the signal output terminal. When the computer is shut down, the micro-process unit receives the shut down signal, and then the micro-process unit outputs a voltage signal, the voltage signal makes the start control unit control the power control unit to disable the connection of the power input unit and the power output unit, so that the standby power of the computer and the peripheral devices thereof is cut off and the power is saved. Besides, a transformation connection unit is used to substitute the micro-process unit and connect the voltage output terminal, wherein the transformation connection unit is able to receive the voltage signal outputted form the voltage output terminal. When the computer is shut down, the voltage output terminal stops to output the voltage signal, and then the switching unit controls the power control unit to disable the connection of the power input unit and the power output unit, so that the standby power of the computer and the peripheral devices is cut off.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To describe the standby power control device of the present invention more clearly, detailed description will be made hereinbelow with reference to the attached drawings.

Figure 3:
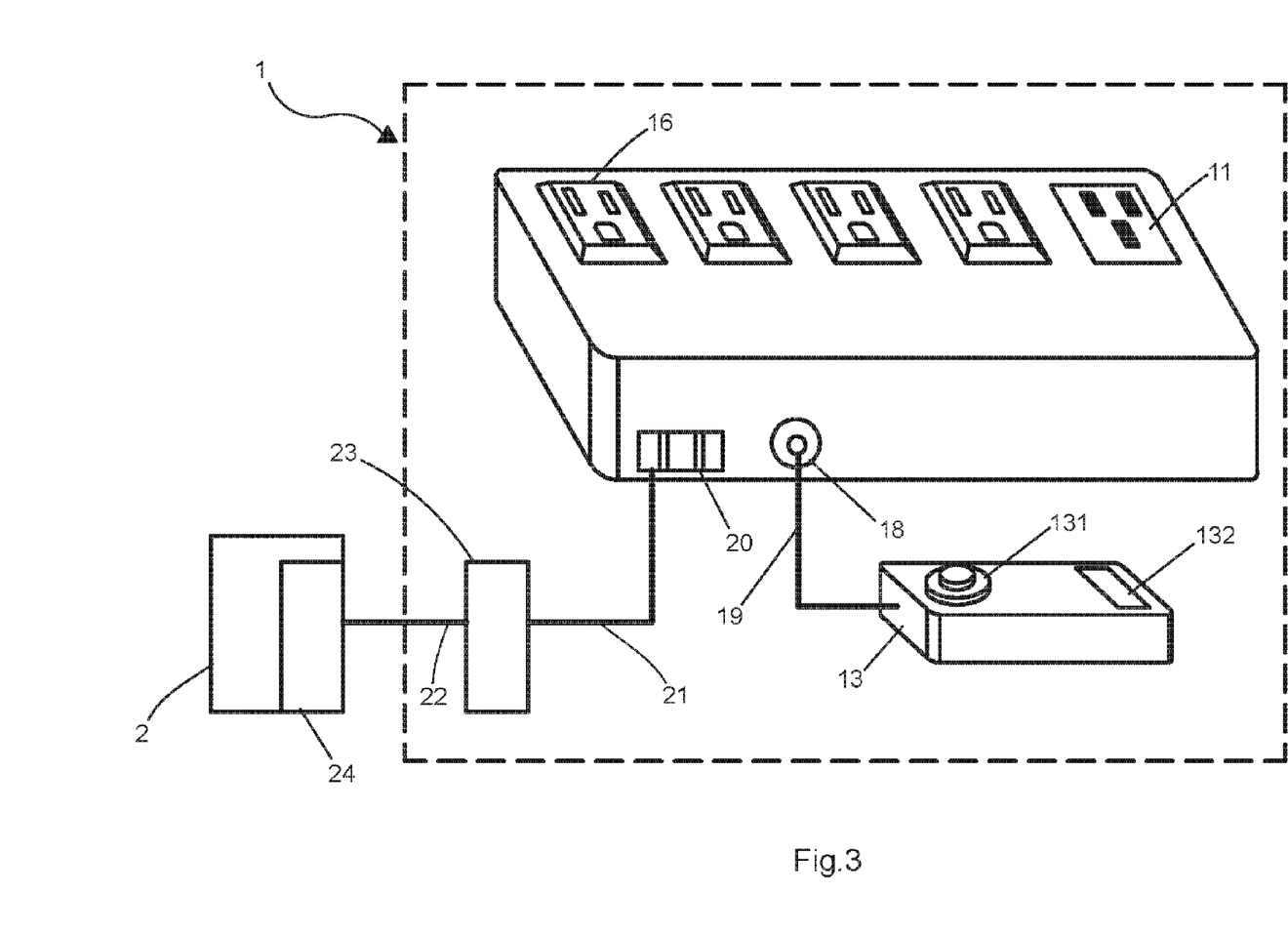
FIG. 3 is a device framework diagram of a first embodiment according to the present invention.
Figure 4:
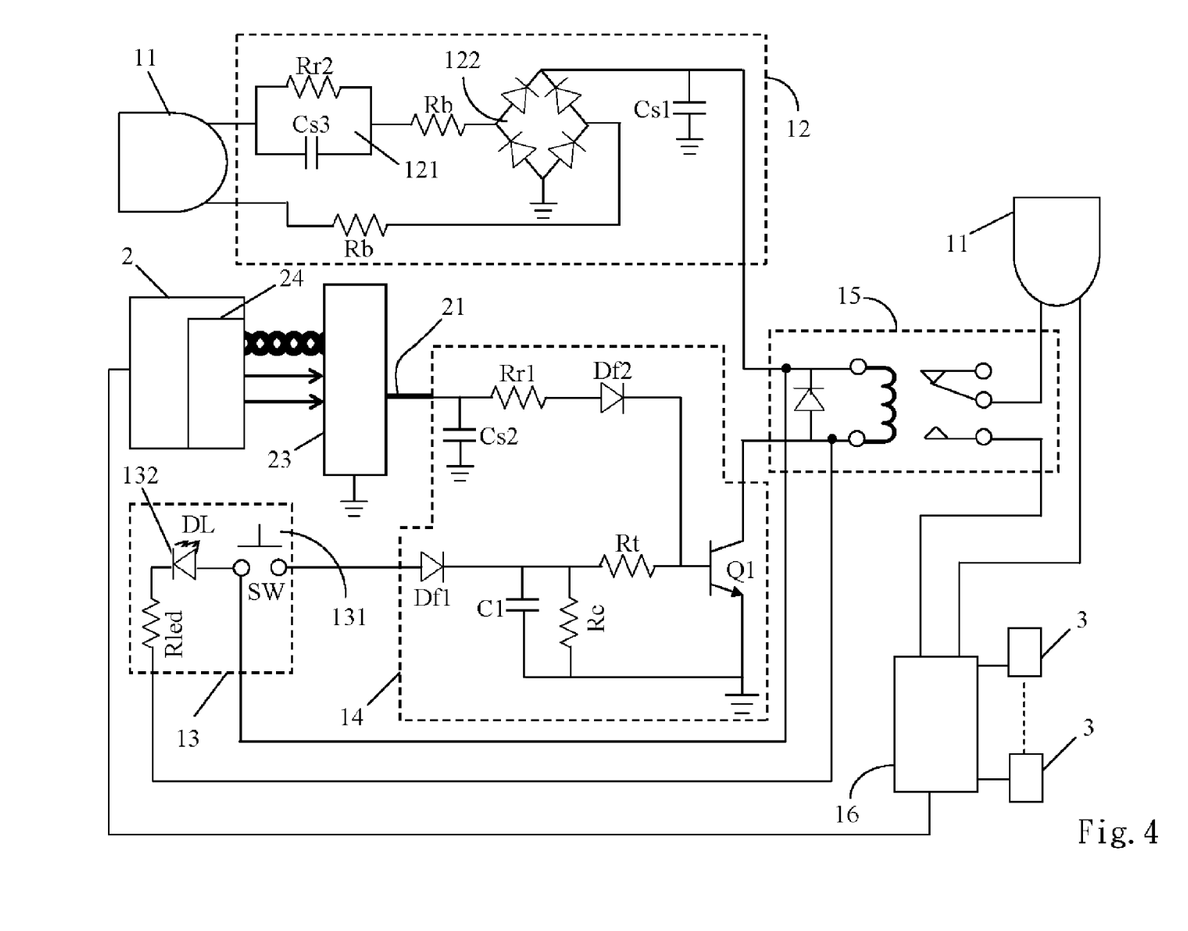
FIG. 4 is a circuit framework diagram of the first embodiment according to the present invention.

Referring to FIG. 3 and FIG. 4, which illustrate a device framework diagram and a circuit framework diagram of a first embodiment according to the present invention. The standby power control device 1 is able to apply in connecting a signal output terminal 24 of a computer 2 for controlling the ON/OFF state of the power of the computer 2 and a plurality of peripheral devices 3 thereof, the standby power control device 1 includes: a power input unit 11, a power transformation unit 12, a switching unit 13, a start control unit 14, a power control unit 15, at least one power output unit 16, a micro-process unit 23, a switching connection aperture 18, and a voltage input plug 20.

The power input unit 11 is connected to an external AC power source.

The power transformation unit 12 is coupled to the power input unit 11 to receive the AC power of the external AC power source. The power transformation unit 12 has a current limitation circuit 121 and a bridge rectifier circuit 122, wherein the current limitation circuit 121 consists of a second current limitation resistor Rr2 and a third capacitor Cs3, the current limitation circuit 121 can execute current limitation of the AC power. The power transformation unit 12 can transform the AC power to a DC power by series connecting the current limitation circuit 121 and the bridge rectifier circuit 122. The power transformation unit 12 also comprises two transformation unit current limitation resistor Rb and a first voltage regulation capacitor Cs1, wherein one transformation unit current limitation resistor Rb is placed between of the current limitation circuit 121 and the bridge rectifier circuit 122, and another one transformation unit current limitation resistor Rb is placed between of the power input unit 11 and the bridge rectifier circuit 122. The first voltage regulation capacitor Cs1 is coupled to the bridge rectifier circuit 122 to execute voltage regulation and filter of the DC power.

The switching unit 13 can be manufactured as a cubic case and placed outside of the standby power control device 1, and the switching unit 13 is connected to the power transformation unit 12 through a switching connection line 19 and the switching connection aperture 18. The switching unit 13 has a start button 131 and indication light 132, as shown in FIG. 4, the start button 131 is a button switch SW and the indication light 132 is the series connection of a lighting diode DL and a resistor Rled in the circuit of the standby power control device 1. Pressing the start button 131 is able to introduce the DC power source outputted from the power transformation unit 12 into the start control unit 14 and turn on the indication light 132 simultaneously.

The start control unit 14 is coupled to the switching unit 13 and the power transformation unit 12, which has a time capacitor C1 and a start transistor Q1. After pressing the start button 131, the DC power source is able to charge the time capacitor C1 to produce a trigger voltage, and then the trigger voltage can turn on the start transistor Q1 to deliver the DC power source out.

The power control unit 15 is a relay, which is coupled to the power input unit 11, the power transformation unit 12 and the start control unit 14. The power control unit 15 can enable/disable the connection of the power input unit 11 and power output unit 16 for controlling the output of the AC power of the external AC power source. When the start transistor Q1 is turned on, the power control unit 15 facilitates the connection of the power input unit 11 and power output unit 16, and then the computer 2 and the peripheral devices 3 is able to obtain the AC power. Moreover, in the first embodiment, when the start transistor Q1 is turn on, the time capacitor C1 starts to discharge, and after the time capacitor C1 discharging a period of time, the time capacitor C1 can not produce the trigger voltage, so that the start transistor Q1 is turned off, and meanwhile, the power control unit 15 halts the connection of the power input unit 11 and the power output unit 16, therefore, the standby power of the computer and the peripheral devices is turned off, so that the power is saved.

The micro-process unit 23 is connected to the voltage input plug 20 via a voltage connection line 21, the micro-process unit 23 is able to coupled to the start control unit 14 through the voltage input plug 20 and voltage connection line 21. The micro-process unit 23 is connected to the signal output terminal 24 by a connection plug 22, wherein the connection plug 22 can be a USB port, a PS/2 port or a COM port of the computer 2. When the computer 2 is booted, the signal output terminal 24 outputs a boot signal, and then the micro-process unit 23 receives the boot signal and output a voltage signal, the voltage signal makes the control unit 14 facilitate the power control unit 15 to enable the connection of the power input unit 11 and the power output unit 16. When the computer 2 is shut down, the signal output terminal 24 outputs a shut down signal, the micro-process unit 23 receives the shut down signal and stops to output the voltage signal, so that the power control unit 15 disables the connection of the power input unit 11 and the power output unit 16, furthermore, the source of the AC power supplied to the computer 2 and the peripheral devices is cut off.

As shown in FIG. 3 and FIG. 4, the start control unit 14 also includes: a transistor buffer resistor Rt, a first forward diode Df1, a second forward diode Df2, a discharge resistor Rc, a first current limitation resistor Rr1, and a second voltage regulation capacitor Cs2. Wherein the transistor buffer resistor Rt is the buffer resistor of the start transistor Q1, the first forward diode Df1 is placed between of the time capacitor C1 and the switching unit 13. After pressing the start button 13, the DC power forwardly turns on the first forward diode Df1 and charges the time capacitor C1. The second forward diode Df2 is placed between of the start transistor Q1 and the micro-process unit 23, wherein when the micro-process unit 23 outputs the voltage signal to the start control unit 14, the voltage signal forward turns on the second forward diode Df2 and keeps the start transistor Q1 on.

Figure 5:
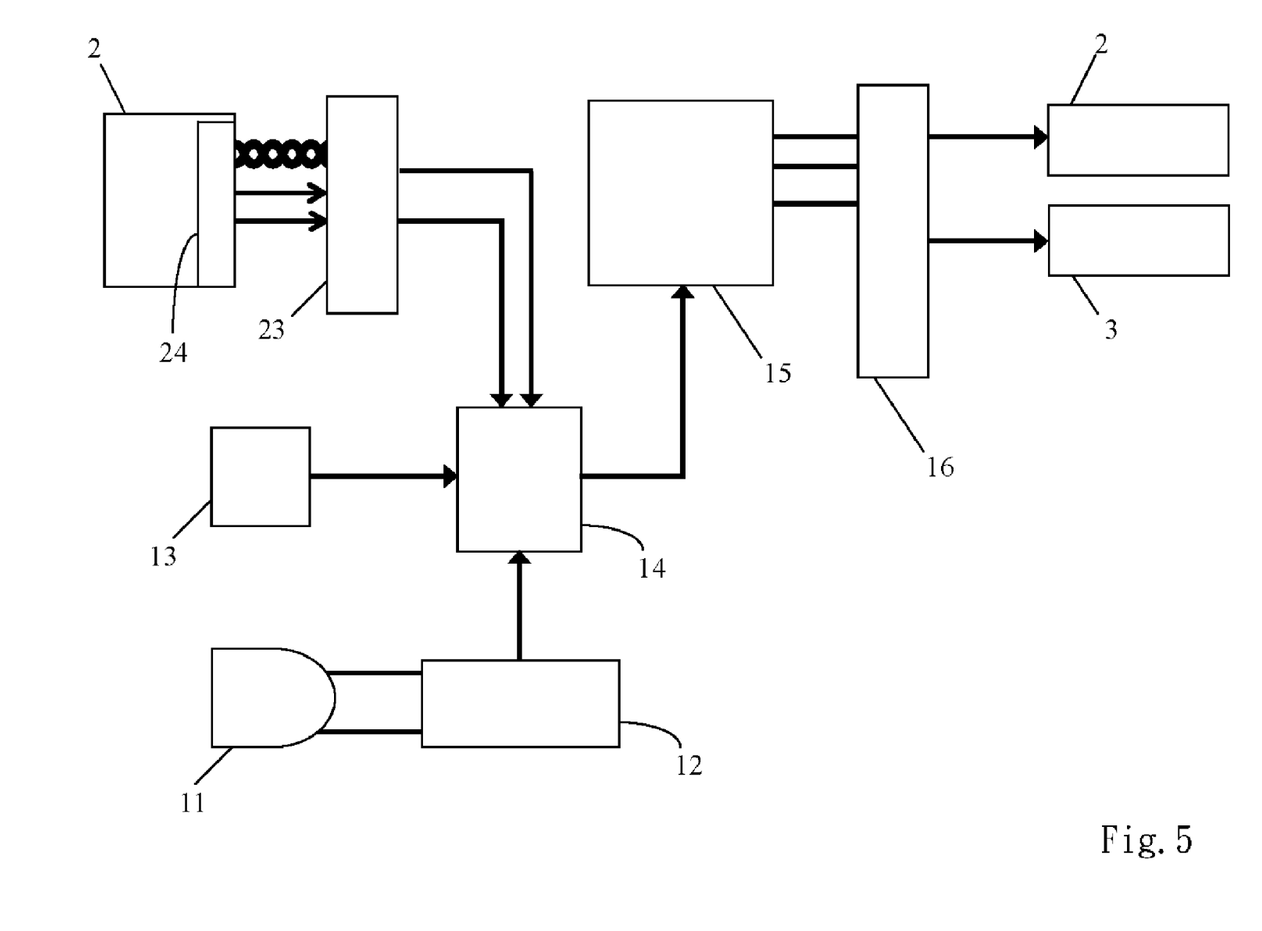
FIG. 5 is a control framework diagram of the first embodiment according to the present invention.

Referring to FIG. 5, which illustrates a control framework diagram of the first embodiment according to the present invention. For more easily understanding the method of executing power control by the standby power control device 1, the method of executing power control according to the control framework diagram includes the steps of: (1) starting the start control unit 14 via the switching unit 13; (2) the power transformation unit 12 outputting the DC power into the start control unit 14; (3) the power control unit 15 facilitates the connection of the power input unit 11 and the power output unit 16; (4) booting the computer 2 within the discharge time of the time capacitor C1; (5) the micro-processor unit 23 detecting the boot signal and outputting the voltage signal to maintain the start control unit 14 in a turn-on condition; (6) when the computer 2 is shut down, the micro-processor unit 23 detecting the shut down signal and stopping to output the voltage signal so as to turn off the start control unit 14 automatically; (7) the power control unit 15 prohibiting the output of the AC power; and (8) the standby power of the computer 2 and the peripheral devices being turned off automatically due to losing the AC power.

Figure 6:
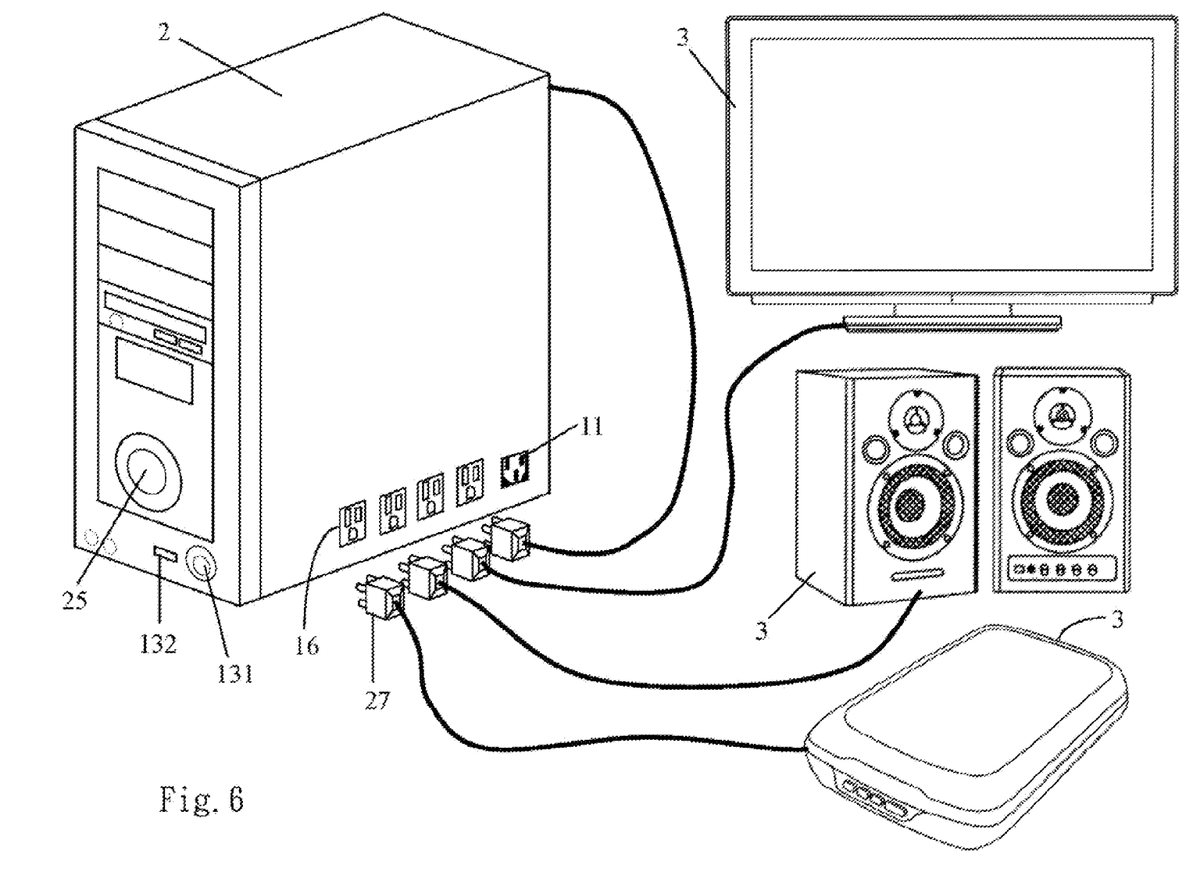
FIG. 6 is a device framework diagram of a second embodiment according to the present invention.

The aforesaid has been clearly disclosed the device framework, the circuit framework and the power control procedures of the first embodiment of the standby power control device 1. In addition, the standby power control device 1 also has a second embodiment in present invention. Please refer to FIG. 6 and FIG. 7, there are shown the device framework diagram and the circuit framework diagram respectively of the second embodiment according to the present invention. The second embodiment of the standby power control device 1 includes: a power input unit 11, a power transformation unit 12, a switching unit 13, a start control unit 14, a power control unit 15, several power output units 16, and a transformation connection unit 17, wherein the whole circuit framework of the power input unit 11, the power transformation unit 12, the switching unit 13, the start control unit 14, the power control unit 15, and the power output unit 16 is the same as the first embodiment, however, the transformation connection unit 17 is different from the micro-process unit 23. As shown in FIG. 6, the standby power control device 1 is capable of being integrated inside the computer 2, the start button 131 can be disposed at the front panel of the computer 2 for facilitating the user to press the start button 131 to activate the standby power control device 1, and the power input unit 11 and the power output unit 16 can be set up at the sides of the computer 2, so that the user can easily insert a power line plug 27 of the computer 2 or the peripheral device 3 into the power output unit 16, furthermore, the computer 2 and the peripheral devices 3 are able to get the external AC power source via the standby power control device 1.

Figure 7:
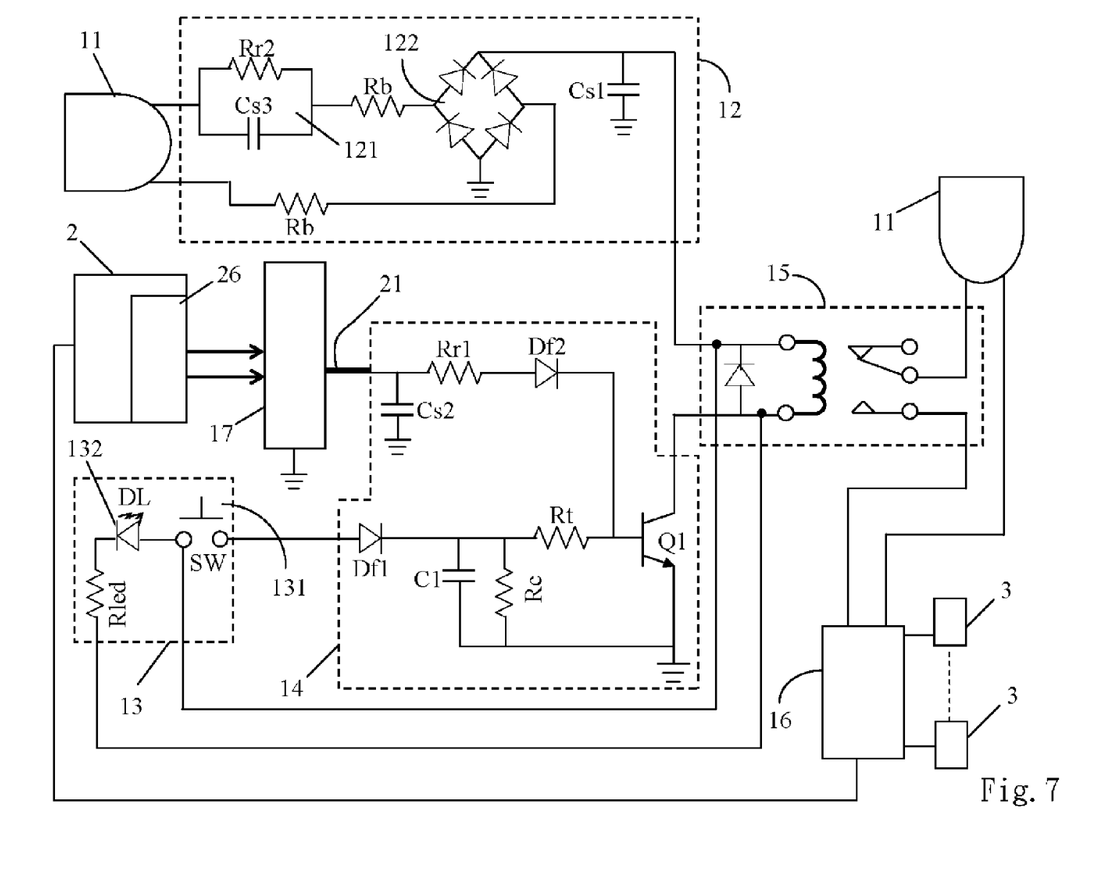
FIG. 7 is a circuit framework diagram of the second embodiment according to the present invention.

Continuously referring to FIG. 6 and FIG. 7, in a second embodiment of the standby power control device 1, the transformation connection unit 17 is substituted for the micro-process unit 23 and connected to a voltage output terminal 26 of the computer 2 for controlling the ON/OFF state of the power of the computer 2 and the peripheral devices thereof. The voltage output terminal 26 can be a power connection port of a power supply of the computer 2, an expansion slot in a motherboard of the computer 2 and a COM port. The transformation connection unit 17 is also coupled to the start control unit 14 through the voltage connection line 21. When the computer 2 is booted, the voltage output terminal 26 outputs the voltage signal, and then the transformation connection unit 17 introduces the voltage signal into the start control unit 14 for keeping the start control unit 14 on, so that the power control unit 15 enables the connection of the power input unit 11 and the power output unit 16. When the computer 2 is shut down, the voltage output terminal 26 stops to output the voltage signal, consequently, the power control unit 15 disables the connection of the power input unit 11 and the power output unit 16 due to that the start control unit 14 is turned off. Furthermore, the AC power supplied to the computer 2 and the peripheral devices is cut off.

Figure 8:
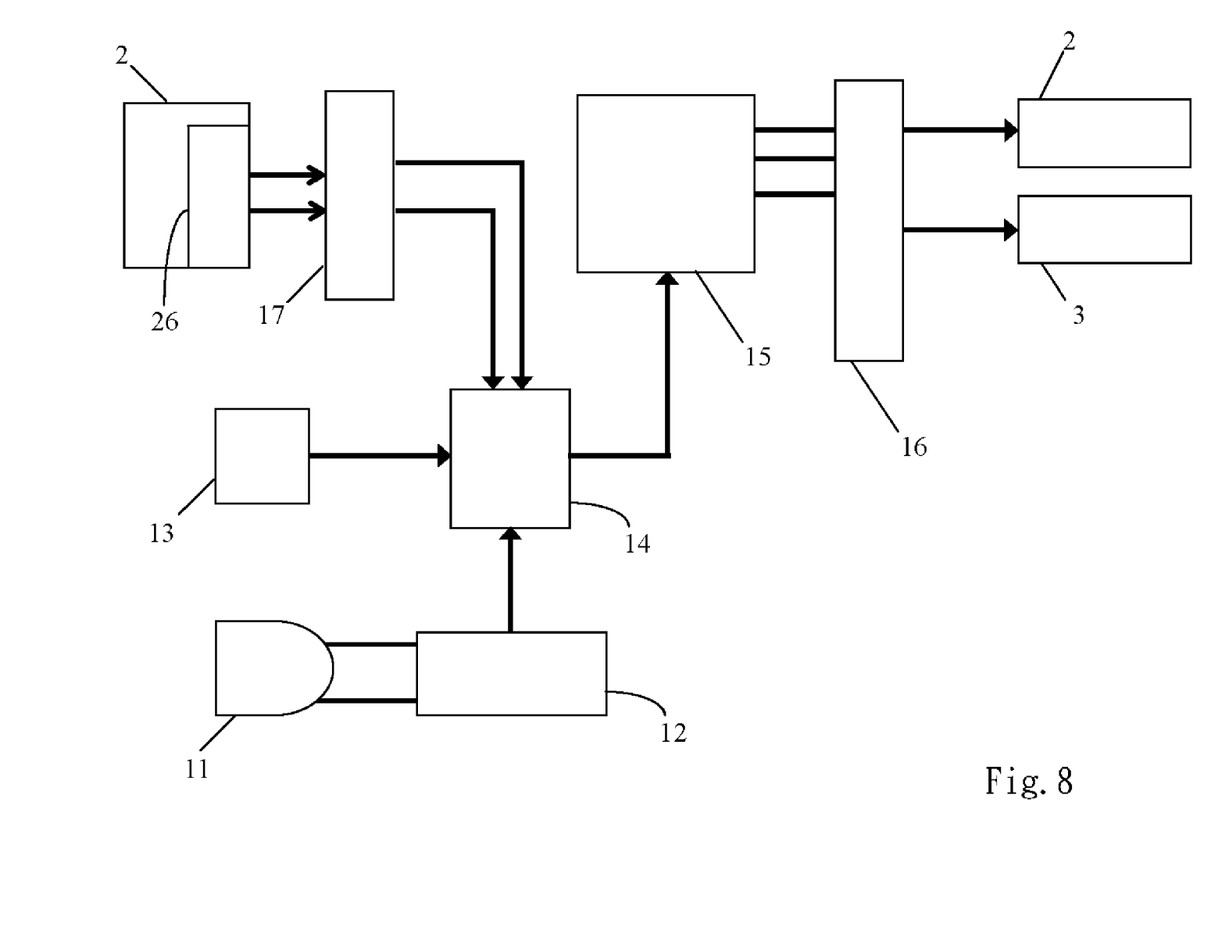
FIG. 8 is a control framework diagram of the second embodiment according to the present invention.

Refer to FIG. 8, which illustrates a control framework diagram of the second embodiment according to the present invention. The control framework of the second embodiment and the control framework of the first embodiment are much alike. In the first embodiment, the micro-process unit 23 receives the shut down signal outputted by the signal output terminal 24, and then the connection of the power input unit 11 and the power output unit 16 is disabled; on the other hand, in the second embodiment, the transformation connection unit 17 directly receives the voltage signal from the voltage output terminal 26 so as to disable the connection of the power input unit 11 and the power output unit 16.

Referring to FIG. 8, method of executing the power control of the second embodiment includes the steps of: (11) starting the start control unit 14 via the switching unit 13; (12) the power transformation unit 12 outputting the DC power to the start control unit 14; (13) booting the computer 2; (14) the transformation connection unit 17 detecting the voltage signal from the voltage output terminal 26 and introducing the voltage signal into the start control unit 14 for keeping the start control unit 14 on; (15) the power control unit 15 facilitating the connection of the power input unit 11 and the power source output 16; (16) when the computer 2 is shut down, the voltage output terminal stopping to output the voltage signal so as to turn off the start control unit 14; (17) the power control unit 15 halting the output of the AC power; (18) the standby power of the computer 2 and the peripheral devices being turned off automatically due to losing the AC power.

Thus, the standby power control device of the present invention has been clearly disclosed by the first embodiment and second embodiment. In summary, the present invention offers the following advantages to overcome the disadvantages brought by the conventional power control devices, and the advantages are as following:

1. For the first embodiment, the micro-process unit detects the shut down signal, then the standby power of the computer and the peripheral devices is cut off through the power control unit for saving power, the first embodiment is adapted to both new types of computer and old types of computers;
2. For the second embodiment, the transformation connection unit can detect the voltage signal of the computer, the standby power of the computer and the peripheral devices is cut off through the power control unit, the second embodiment is also adapted to both new types of computers and old types of computers; and
3. With the computer being turned off, the standby power control device of the present invention is turned off as well, so that the power can be saved.

What is claimed is:

1. A standby power control device capable of connecting a signal output terminal or a voltage output terminal of a computer for controlling an ON/OFF state of a power of the computer and a plurality of peripheral devices thereof, the standby power control device comprising:

a power input unit, being connected to an external AC power source;

a power transformation unit, being coupled to the power input unit for transforming an AC power of the external AC power source to DC power;

a switching unit, being coupled to the power transformation unit and having a start button and an indication light, wherein to press the start button makes the DC power be conducted to a next circuit stage of the switching unit and the indication light be turned on simultaneously;

a start control unit, being coupled to the switching unit and the power transformation unit, the start control unit having a time capacitor and a start transistor, wherein after pressing the start button the DC power is able to charge the time capacitor to produce a trigger voltage, and then the trigger voltage turning on the start transistor to carry the DC power out;

a power control unit, being coupled to the power input unit, the power transformation unit and the start control unit, the power control unit being capable of controlling the output of the AC power of the external AC power source;

a power output unit, being coupled to the power input unit and the start control unit, the power output unit being able to receive the external AC power so as to facilitate the computer and the plurality of peripheral devices to obtain the AC power by connecting to the power output unit;

a micro-process unit, being connected to the signal output terminal and coupled to the start control unit, wherein when the computer is booted, the signal output terminal outputting a boot signal to the micro-process unit, and then the micro-process unit outputting a voltage signal to the start control unit to continuously turn on the start transistor, when the computer is shut down, the micro-process receiving a shut down signal from the signal output terminal and then the micro-process stopping to output the voltage signal to the start control unit, so that the power control unit stops the input of the external AC power, a standby power of the computer and the peripheral devices being turned off automatically;

a switching connection aperture, being connected to the switching unit via a switching connection line, so that the switching unit is capable of being placed outside of the standby power control device; and a voltage input plug, being connected to the micro-process unit or the transformation connection unit to introduce the voltage signal into the start control unit through the voltage connection line.

2. The standby power control device of claim 1, wherein the micro-process unit being able to be a transformation connection unit, being connected to the voltage output terminal, when the computer is booted, the voltage output terminal outputting the voltage signal to the transformation connection unit, and then the transformation connection unit introducing the voltage signal into the start control unit through the voltage connection line so as to continuously keep the start transistor on, when the computer is shut down, the voltage output terminal stopping to output the voltage signal, so that the computer and the peripheral devices are turned off automatically.

3. The standby power control device of claim 1, wherein the signal output terminal is selected from the group consisting of: a USB port, a PS/2 port and a COM port.

4. The standby power control device of claim 1, wherein the voltage output terminal is selected from the group consisting of: a power connection port of a power supply of the computer, an expansion slot in a motherboard of the computer and a COM port.

5. The standby power control device of claim 1, wherein the standby power control device is capable of being integrated inside the computer, the power input unit and the power output unit being able to be installed at the lateral sides of the computer, the start button being able to be disposed at a front panel of the computer for facilitating to start the standby power control device.

* * * * *